MAGNETIC READER

Filed Aug. 28, 1958

INVENTORS
ROBERT J. YOUNGQUIST
ROBERT H. HANES
Carpenter, Abbott, Coulter & Kinney
ATTORNEYS 3,013,206
Patented Dec. 12, 1961

3,013,206
MAGNETIC READER

Robert J. Youngquist, Arden Hills, and Robert H. Hanes, Stillwater, Minn., assignors to Minnesota Mining and Manufacturing Company, St. Paul, Minn., a corporation of Delaware Filed Aug. 28, 1958, Ser. No. 757,781
6 Claims. (Cl. 324—38)

This invention relates to a device for the visual observation of magnetic signals recorded on a magnetic recording medium in tape or sheet form.

Magnetic recording tape is often criticized because the recorded signals are invisible, and the criticism has been strong enough to deny it certain important markets. For example, this has been a major factor in hampering sales efforts at substituting magnetic recording tape and card equipment for punched tape and card equipment which presently is dominant in automatic digital data-handling systems. Although magnetic recording devices are faster and more troublefree, potential customers have often balked at losing the ability to check recorded information visually. It has been suggested that the information be printed in ink alongside the magnetic signals, but this vitiates major competitive advantages of magnetic recording sheet material, e.g., ease in correction, economy in reuse, simplicity of equipment, compactness of recorded data, etc.

The need for fast, convenient means for making magnetic signals recorded on magnetic tape visible is especially great in the recording of television signals. Recorded on the tape along with the picture signals are synchronizing signals which indicate the beginning of each frame. If the tape is spliced without synchronizing signals being matched, receiving sets are thrown out of synchronization, and a short, but disturbing period elapses before the received picture returns to normal.

Heretofore, magnetic signals recorded on magnetic tape have, in a sense, been rendered visible by smearing finely-divided ferromagnetic material over the tape and allowing it to migrate to points of maximum magnetic flux. Besides being slow and messy, this procedure involved the greater disadvantage that thorough cleaning of the recording medium was required to prevent the applied ferromagnetic material from supplying false signals. This procedure is treated in the television industry as unacceptable for the splicing of magnetic recording tape, and splicing has instead been confined to tape areas in which the picture is blanked out.

We have now devised fast, convenient means for the visual observation of magnetic signals recorded on magnetic tape and the like. Among other benefits, our invention enables the matching of synchronizing signals with ease in splicing magnetic recording tape in television use. Devices embodying our invention are so easy to construct and simple in use that broader areas of application will now be opened to magnetic tape recording equipment. Also, our invention should have utility in such collateral applications as the design of magnetic recording heads, by offering convenient means for studying the patterns of magnetic signals.

Briefly, the device of our invention comprises a firm, non-ferromagnetic, hollow vessel having a transparent portion and a thin, smooth-faced exterior portion, which portions are in part united and in part uniformly and closely spaced to enclose in a shallow, relatively broad cavity a suspension in a transparent liquid vehicle of flat, visible, weakly ferromagnetic crystals which orient when suspended in liquid in a magnetic field. The vessel is preferably flat and rigid and may incorporate means for holding magnetic recording sheet material against the thin, smooth-faced exterior portion. However, the vessel might be curved to conform to a rigid magnetic recording drum or may be sufficiently compliant to fit tightly at its thin, smooth-faced exterior portion against either flat or gently curved surfaces.

When sheet material on which magnetic signals have been recorded is brought into close proximity to the suspension of crystals in the broad shallow cavity, the crystals align themselves in the magnetic field of each signal and, being flat, present a markedly different degree of reflectivity to incident light. Because the liquid vehicle of the suspension is transparent and the cavity is shallow, the field of each magnetic signal is visibly outlined. Since the individual crystals need not migrate, but simply shift position, the information is presented in a matter of a second or two.

Our invention may be more easily understood by reference to the drawing in which.

Figure 2:
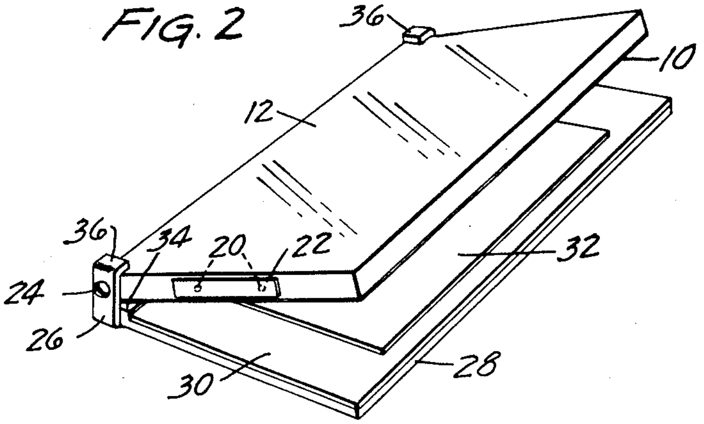
FIGURE 2 is a perspective view of the device, with certain details eliminated, showing the positioning of a magnetic recording card for visual observation of signals recorded thereon.
Figure 3:
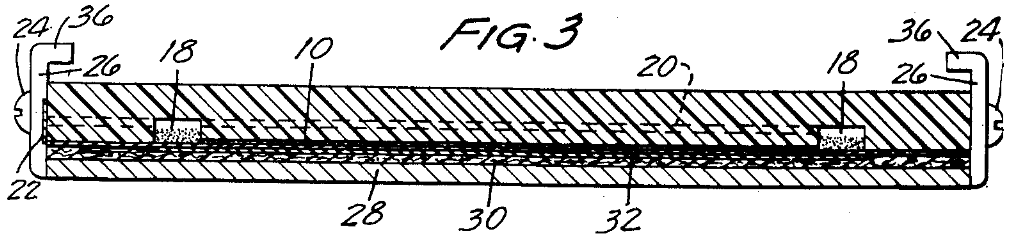
FIGURE 3 is a cross-section along line 3—3 of FIGURE 1, enlarged to twice the scale.
Figures 1, 4:
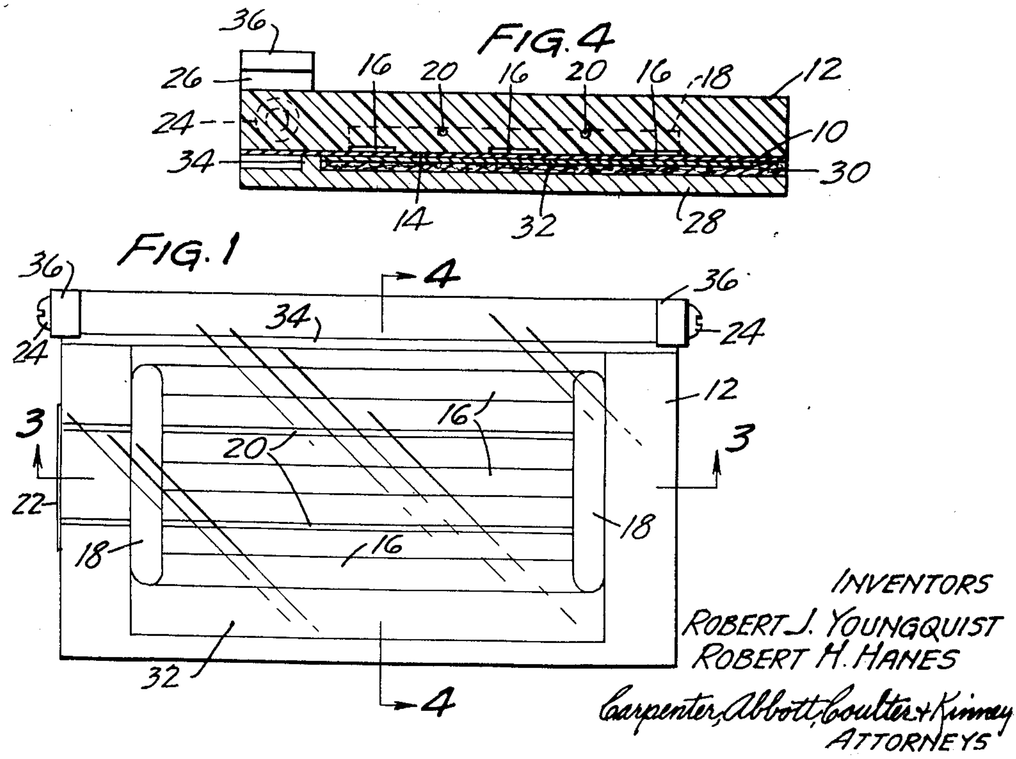
FIGURE 1 is a top elevational view of a device embodying the essential features of our invention.
FIGURE 4 is a cross-section along line 4—4 of FIGURE 1, also enlarged.

Referring in detail to the drawing, a glass sheet 10 of about 0.005 inch thickness is bonded to a strong, rigid block 12 of transparent plastic such as methyl polymethacrylate, the lower surface 14 of which is formed with three recessed areas 16. Enclosed by the glass sheet 10 in the uniformly shallow, relatively broad cavities at said recessed areas 16 is a suspension (not illustrated) in a transparent liquid vehicle of flat, visible, weakly ferromagnetic crystals which orient when suspended in liquid in a magnetic field. The recessed areas 16 are interconnected at each end by a pair of relatively deep reservoirs 18 which in turn are interconnected by a pair of cylindrical conduits 20 extending to one surface of the block 12. The liquid suspension may be introduced into the reservoirs 18 and the cavities formed by recessed areas 16 through one of conduits 20, with the other serving to bleed off air. A strip of transparent pressure-sensitive adhesive tape 22 serves to seal the openings of conduits 20 against leakage.

The block 12 is pivotally mounted by means of screws 24 to brackets 26 of a metal plate 28. A felt pad 30 adhered to the plate 28 serves to compress a magnetic recording card 32 (inserted as shown in FIGURE 2) against the glass sheet 10 when the block 12 is pivoted to the closed position. The plate 28 is also provided with a stop 34 for positioning the magnetic card 32. Inwardly extending tips 36 of brackets 26 limit the extent to which the block 12 may be pivoted upon opening.

A device as described and illustrated has been tested using a magnetic recording card 32 on which were recorded magnetic signals in the form of letters and numbers. For use in the device, a liquid suspension was prepared from a ground mixture of 2 grams $Fe_2O_3$ and 8 grams $Na_2B_4O_7 \cdot 10H_2O$ (borax) which was heated in a 40 ml. platinum crucible supported by a thin steel plate in an air-circulating oven at 1100° C. for 17 hours. The crucible was then removed and cooled by standing in air at room temperature, still in contact with the steel plate. The solidified melt of alpha-$Fe_2O_3$ crystals thus obtained was leached with hot water, the pH value of the suspension was lowered to 1.5 with dilute nitric acid, and the crystals were filtered off and washed. The aqueous paste was stirred into water to provide a total of 60 parts by weight water per part of $Fe_2O_3$, and about 2 percent by weight based on $Fe_2O_3$ of detergent, e.g., triethanol amine lauryl sulfate, was added as a wetting agent and antistatic agent. Since the $Fe_2O_3$ crystals tended to settle out of the brownish suspension thus produced, the suspension was shaken immediately prior to feeding it into a conduit 20 of the test device. The reservoirs 18 of the device were filled to about one-half their height of 3/16 inch, leaving sufficient airspace for effective shaking to return to suspension alpha-$Fe_2O_3$ crystals which settle out over a period of time. This tendency to settle would be minimized by screening particles greatly in excess of 10 microns diameter from the suspension. A more detailed discussion concerning the preparation and characteristics of flat alpha-$Fe_2O_3$ crystals is contained in a letter to the editor entitled "New Method for Making Magnetic Fields Visible" appearing in the Journal of Applied Physics, February 1958, pages 223–224.

When the illustrated device was closed upon the magnetic recording card 32, the magnetic signals beneath the recessed areas 16 almost immediately were outlined in the form of letters and numbers in clearly readable form, as the flat crystals of the enclosed liquid suspension oriented with the fields of the signals. Signals on the card 32 beneath the half-filled reservoirs 18 were not visible. Upon removal of the magnetic recording card, the signals almost immediately disappeared.

When a suspension of flat gamma-$Fe_2O_3$ crystals, which are strongly ferromagnetic, is used, the crystals do not orient but rather migrate to the fields of each magnetic signal and so visibly outline each signal within a relatively short time. However, because the speed with which the gamma-$Fe_2O_3$ crystal suspension reproduces the magnetized information is slow compared to the speed of action of the alpha-$Fe_2O_3$ suspension, the latter is normally much preferred. Moreover, because of the migration of the crystals in the gamma-$Fe_2O_3$ suspension, shaking is required after a reading to regain a homogeneous suspension.

Devices have been constructed with the recessed areas 16 as deep as 0.040 inch and as shallow as 0.010 inch. In the former case definition was poor, and in the latter, it was difficult to eliminate air bubbles on filling and to return settle-out crystals to suspension by shaking. Elimination of crystals much larger than 10 microns diameter should make such thinner depths more feasible. With the suspension prepared as described above, depths of about 0.015–0.020 inch were found to be entirely satisfactory.

For sheet 10 of the illustrated device, glass is particularly preferred in view of its excellent strength and rigidity and has demonstrated adequate durability at a thickness of 0.005 inch, at which thickness excellent signal definition is attained. Much thinner glass sheets are not preferred, since the disadvantage in greater fragility more than offsets the advantage in improved signal definition. On the other hand, if the thickness of the sheet 10 is increased to more than about 0.020 inch, magnetic signals become almost indiscernible. Flexible plastic films usually lack the rigidity required to insure maintenance of uniformity of depth in the recessed areas 16 and have increased settling-out tendencies and difficulties in returning the settled crystals to suspension. While presently less preferred for this reason, more rigid plastic films would have excellent utility if made available in commerce. Non-magnetic metal sheet is also useful.

Glass and a variety of transparent plastics are suitable for the construction of the recessed block 12. This block may be formed with a magnifying top surface, or a magnifying glass may be attached. The recesses 16 of the block are preferably located so that all areas of the magnetic recording card 32 which contain recorded information may be inspected visually in one positioning of the card. For devices designed for portraying television signals on magnetic recording tape for splicing purposes, only the synchronizing track need be visible. In other cases the block may be provided with only one large recessed area and a plurality of studs to support the thin sheet enclosing these areas. Other constructions providing means for positioning a shallow, broad cavity enclosing a liquid suspension of the type described closely adjacent to magnetic recording sheet material will occur to skilled artisans after reading the foregoing description.

What is claimed is:

1. A device for the visual observation of magnetic signals recorded on a magnetic recording medium in tape or sheet form, said device comprising a firm, non-ferromagnetic, hollow vessel having a transparent portion and a uniformly thin, smooth-faced exterior portion, which portions are in part united and in part uniformly and closely spaced to enclose a shallow, relatively broad cavity, and filling said cavity, a suspension in a transparent liquid vehicle of flat, visible, weakly ferromagnetic crystals which orient when suspended in liquid in a magnetic field.

2. A device for the visual observation of magnetic signals recorded on a magnetic recording medium in tape or sheet form, said device comprising a non-ferromagnetic, hollow vessel having a strong, rigid transparent block, one surface of which is formed with at least one recessed area, and a thin, rigid, smooth-faced exterior sheet bonded to said block to enclose a uniformly shallow, relatively broad cavity at said recessed area, and filling said cavity, a suspension in a transparent liquid vehicle of flat, opaque, weakly ferromagnetic crystals which orient when suspended in liquid in a magnetic field.

3. A device for the visual observation of magnetic signals recorded on a magnetic recording medium in tape or sheet form, said device comprising a firm, non-ferromagnetic, hollow vessel having (*a*) a strong, rigid transparent plastic block, one surface of which is formed with a plurality of recessed areas, each of which is connected to at least one relatively large interior reservoir, (*b*) a thin sheet of glass bonded to said block to enclose uniformly shallow, relatively broad cavities at said recessed areas, and (*c*) an aqueous suspension of fine flat crystals of alpha-$Fe_2O_3$ contained in said broad cavities and said reservoir in sufficient quantity to fill the broad cavities.

4. A device for the visual observation of magnetic signals recorded on a magnetic recording medium in tape or sheet form, said device comprising a firm, non-ferromagnetic, hollow vessel having (*a*) a strong, rigid transparent plastic block, one surface of which is formed with a plurality of recessed areas, each of which is connected to at least one relatively large interior reservoir, (*b*) a thin sheet of non-ferromagnetic metal bonded to said block to enclose uniformly shallow, relatively broad cavities at said recessed areas, and (*c*) an aqueous suspension of fine flat crystals of alpha-$Fe_2O_3$ contained in said broad cavities and said reservoir in sufficient quantity to fill the broad cavities.

5. A device for the visual observation of magnetic signals recorded on a magnetic recording medium in tape or sheet form, said device comprising a firm, non-ferromagnetic, hollow vessel having a transparent portion and a uniformly thin, smooth-faced exterior portion, which portions are in part united and in part uniformly and closely spaced to enclose at least one shallow, relatively broad cavity, and filling said cavity, a suspension in a transparent liquid vehicle of fine flat crystals of alpha-$Fe_2O_3$ visible through said transparent portion.

6. A device for the visual observation of magnetic signals on a magnetic recording medium in tape or sheet form, said device comprising a rigid, non-ferromagnetic, hollow vessel having a transparent window forming its top surface and a thin, rigid, smooth-faced exterior sheet forming its bottom surface, said window and said exterior sheet being sealed together to enclose at least one uniformly shallow, relatively broad cavity, and filling said cavity, a suspension in a transparent liquid vehicle of fine flat crystals of alpha-$Fe_2O_3$ visible through said window.

References Cited in the file of this patent

UNITED STATES PATENTS

| | | |
|---|---|---|
| 2,530,564 | Blaney | Nov. 21, 1950 |
| 2,764,733 | De Forest | Sept. 25, 1956 |

FOREIGN PATENTS

| | | |
|---|---|---|
| 439,324 | Great Britain | Dec. 4, 1935 |